United States Patent
Stanjek et al.

(10) Patent No.: US 11,773,206 B2
(45) Date of Patent: Oct. 3, 2023

(54) METHOD FOR PRODUCING SILANE-TERMINATED POLYMERS

(71) Applicant: WACKER CHEMIE AG, Munich (DE)

(72) Inventors: Volker Stanjek, Ampfing (DE); Lars Zander, Altoetting (DE)

(73) Assignee: Wacker Chemie AG, Munich (DE)

( * ) Notice: Subject to any disclaimer, the term of this patent is extended or adjusted under 35 U.S.C. 154(b) by 240 days.

(21) Appl. No.: 17/265,826

(22) PCT Filed: Aug. 17, 2018

(86) PCT No.: PCT/EP2018/072367
§ 371 (c)(1),
(2) Date: Feb. 4, 2021

(87) PCT Pub. No.: WO2020/035154
PCT Pub. Date: Feb. 20, 2020

(65) Prior Publication Data
US 2021/0309792 A1    Oct. 7, 2021

(51) Int. Cl.
| | |
|---|---|
| *C08G 77/08* | (2006.01) |
| *C08G 18/71* | (2006.01) |
| *C08G 18/22* | (2006.01) |
| *C08G 18/38* | (2006.01) |
| *C08G 18/77* | (2006.01) |
| *C08G 77/26* | (2006.01) |

(52) U.S. Cl.
CPC ......... *C08G 18/718* (2013.01); *C08G 18/227* (2013.01); *C08G 18/3893* (2013.01); *C08G 18/778* (2013.01); *C08G 77/08* (2013.01); *C08G 77/26* (2013.01)

(58) Field of Classification Search
CPC ............. C08G 18/718; C08G 18/3893; C08G 18/778; C08G 18/227; C08G 77/08; C08G 77/26
See application file for complete search history.

(56) References Cited

U.S. PATENT DOCUMENTS

| | | | | |
|---|---|---|---|---|
| 7,524,915 B2* | 4/2009 | Huang | .................. | C08G 18/10 528/59 |
| 8,232,362 B2* | 7/2012 | Yang | .................. | C08G 18/227 528/38 |
| 8,907,027 B2 | 12/2014 | Stanjek et al. | | |
| 9,309,437 B2 | 4/2016 | Stanjek et al. | | |
| 9,340,714 B2 | 5/2016 | Stanjek et al. | | |
| 2005/0119436 A1 | 6/2005 | Ziche et al. | | |
| 2007/0060732 A1* | 3/2007 | Yang | .................... | C08G 18/10 528/44 |
| 2007/0100108 A1* | 5/2007 | Huang | ............... | C08G 18/4825 528/85 |
| 2008/0311419 A1* | 12/2008 | Ramdatt | ............ | C08G 18/4808 524/588 |
| 2011/0028640 A1 | 2/2011 | Klein et al. | | |

FOREIGN PATENT DOCUMENTS

| | | |
|---|---|---|
| DE | 102008021221 A1 | 10/2009 |
| DE | 102011087603 A1 | 6/2013 |
| EP | 1535940 B1 | 6/2007 |
| EP | 2271687 B1 | 5/2013 |
| EP | 2744842 B1 | 12/2015 |
| EP | 2561024 B1 | 5/2016 |
| EP | 3026091 A1 | 6/2016 |
| EP | 2785755 B1 | 1/2017 |
| JP | 2009508985 A | 3/2009 |
| JP | 2016121332 A | 7/2016 |

OTHER PUBLICATIONS

Acclaim 4200 technical data sheet, Covestro.com; Apr. 2015.*
Acclaim 8200 technical data sheet, Covestro.com; Apr. 2015.*

* cited by examiner

*Primary Examiner* — Margaret G Moore
(74) *Attorney, Agent, or Firm* — BROOKS KUSHMAN P.C.

(57) ABSTRACT

Silane-terminated polymers of the formula (I)

$$Y\text{---}[Z\text{---}C(\text{=}O)\text{---}NR^3\text{---}(CR^1{}_2)_b\text{---}SiR_a(OR^2)_{3-a}]_x \qquad (I),$$

are produced by reacting at least one hydroxy-functional polymer (a), comprising at least one polyether, polyester and/or polyacrylate unit, with at least one compound having at least one isocyanate group, in the presence of at least one bismuth-containing catalyst (K), with the proviso that the reaction mixture comprises 50 to 250 ppm water at the start of the reaction.

5 Claims, No Drawings

METHOD FOR PRODUCING SILANE-TERMINATED POLYMERS

CROSS REFERENCE TO RELATED APPLICATIONS

This application is the U.S. National Phase of PCT Appln. No. PCT/EP2018/072367 filed Aug. 17, 2018, the disclosure of which is incorporated in its entirety by reference herein.

BACKGROUND OF THE INVENTION

1. Field of the Invention

The invention relates to a method for producing cross-linkable silane-terminated polymers having an increased stability to atmospheric humidity.

2. Description of the Related Art

Moisture crosslinkable preparations are generally known. They are widely used as adhesives and sealants as well as for coatings. An important moisture-reactive binder for such products are silyl-functionalized polymers. Preferred among these in turn are those having terminal alkoxysilyl groups, since the cleavage products are non-corrosive and are not of toxicological concern at the low concentrations released.

Appropriate alkoxysilane-terminated prepolymers have long been known in the prior art and are commercially available, for example, under the trade names GENIOSIL® STP-E (Wacker Chemie AG), MS-Polymer (Kaneka), DESMOSEAL (Bayer AG) or SPUR (Momentive).

The silyl-functionalized polymers are produced by known methods. Common to these methods, inter alia, is the reaction of polyols, especially hydroxy-terminated polyethers, polyurethanes or polyesters as well as hydroxy-functionalized polyacrylates, with isocyanatoalkylalkoxysilanes. A further method provides a reaction of the aforementioned polyols with di- or polyisocyanates, wherein the latter are used in excess, such that isocyanate-functional polymers are produced in a first step, which are then reacted in a second reaction step with alkoxysilanes having an alkyl-bonded group reactive with isocyanates, especially N-substituted aminoalkylalkoxysilanes.

The reaction of hydroxy-functional polymers with isocyanates, such as the aforementioned isocyanatoalkylalkoxysilanes, di- or polyisocyanates, is preferably carried out in the presence of catalysts since sufficiently high reaction rates for an economic production of the alkoxysilane-terminated polymers can only then be achieved in the corresponding reaction step. Numerous compounds are known as silane condensation catalysts such as, for example, dialkyltin(IV) compounds such as dibutyltin dilaurate or dioctyltin dilaurate, diverse metal complex compounds (chelates and carboxylates), e.g. of titanium, zirconium, amines and salts thereof and other known acidic and basic catalysts.

A disadvantage of the use of the aforementioned catalyst types however is the fact that these remain after the reaction in the end product, the silane-functional polymer, and can therefore also catalyze the reaction thereof with moisture and the moisture-curing linked thereto. This impairs the storage stability of the corresponding product and complicates handling thereof.

Of advantage here is the use of bismuth catalysts such as is described, e.g. in EP-A 1535940, EP-A 2271687 or EP-A 2785755, since these have high catalytic activity for accelerating the reaction of hydroxy-functional polymers with isocyanates, but at the same time only comparatively weakly catalyze the hydrolysis and condensation of silane groups. This exceptionally desired combination of opposing catalytic effects on urethane formation and silane condensation is very convincingly demonstrated, especially in EP-A 1535940.

At the same time, one skilled in the art can learn from the examples of EP-A 2271687 or EP-A 2785755 that it is advantageous if the polyol, which is to be reacted with an isocyanate-functional compound, is dried prior to use of a bismuth catalyst. This avoids on the one hand a secondary reaction of the isocyanate functions with the water otherwise present to form urea groups, but especially the desired high catalytic activity of bismuth catalysts to urethane formation is permanently impaired by water.

Drying is conducted in this case at temperatures of 80-100° C. under reduced pressure. Under these conditions, a dried polyol having a water content significantly below 50 ppm is obtained. Under these conditions, the subsequent reaction with an isocyanate-functional compound (in the case of EP-A 2785755 with a diisocyanate, in the case of EP-A 2271687 an isocyanatoalkylalkoxysilane) is complete within one hour.

However, a disadvantage of this method is the additional effort which arises from the very thorough drying of the polyol to be used.

SUMMARY OF THE INVENTION

The invention relates to a method for producing silane-terminated polymers of the formula (I)

$$Y-[Z-C(=O)-NR^3-(CR^1{}_2)_b-SiR_a(OR^2)_{3-a}]_x \qquad (I),$$

where
Y is an x-valent polymer radical comprising at least one polyether, polyester and/or polyacrylate unit,
R may be identical or different and is a hydrogen atom or a monovalent, optionally substituted, SiC-bonded hydrocarbon radical,
$R^1$ may be identical or different and is a hydrogen atom or a monovalent, optionally substituted hydrocarbon radical,
$R^2$ may be identical or different and is a hydrogen atom or a monovalent, optionally substituted hydrocarbon radical,
$R^3$ may be identical or different and is a hydrogen atom, a monovalent, optionally substituted hydrocarbon radical, a $-(CR^1{}_2)_b-SiR_a(OR^2)_{3-a}$ group or a $-CH(COOR')-CH_2-COOR'$ group,
R' may be identical or different and is a monovalent, optionally substituted hydrocarbon radical,
Z may be identical or different and is NH or an oxygen atom,
x is an integer from 1 to 50, preferably 1, 2 or 3, particularly preferably 2,
a may be identical or different and is 0, 1 or 2, preferably 0 or 1, and
b may be identical or different and is an integer from 1 to 10, preferably 1, 3 or 4, particularly preferably 1 or 3, especially 1,
by reacting at least one hydroxy-functional polymer (a), comprising at least one polyether, polyester and/or polyacrylate unit, with at least one compound having at least one isocyanate group, in the presence of at least one bismuth-containing catalyst (K), with the proviso that the reaction mixture comprises 50 to 250 ppm water at the start of the reaction.

DETAILED DESCRIPTION OF THE PREFERRED EMBODIMENT

The ppm figures in this case describe 1 part by weight water per 1,000,000 parts by weight reaction mixture.

The invention is based on the surprising discovery that although water contents above 250 ppm significantly slow the reaction, this is surprisingly not the case at lower water contents. This discovery is all the more remarkable in view of the fact that the effect of the water content on the reactivity of the catalyst (K) is largely independent of its concentration. Therefore, at high water concentrations that are not in accordance with the invention, sufficiently high reaction rates can no longer be achieved even at relatively high catalyst concentrations, whereas at low water concentrations in accordance with the invention, even very low catalyst concentrations are sufficient.

However, it is especially surprising that a water content below 250 ppm but above 50 ppm is already sufficiently low and has no more significant loss of reactivity compared to almost completely anhydrous reaction mixtures. This surprising discovery permits a substantially simpler drying of the usually hygroscopic and thus often water-containing hydroxy-functional polymers (a) used than is described in the prior art. In the best case, in which the raw materials used, particularly the hydroxy-functional polymers (a) used, have sufficiently low water contents at the outset, this discovery can even render a drying step completely superfluous.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical, isooctyl radicals and the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m-, p-tolyl radicals, xylyl radicals, and ethylphenyl radicals; and aralkyl radicals such as the benzyl radical, and the α- and the β-phenylethyl radicals.

Examples of substituted radicals R are haloalkyl radicals such as the 3,3,3-trifluoro-n-propyl radical, the 2,2,2,2',2', 2'-hexafluoroisopropyl radical and the heptafluoroisopropyl radical, and haloaryl radicals such as the o-, m- and p-chlorophenyl radical.

Preferably, the radicals R are monovalent hydrocarbon radicals, optionally substituted with halogen atoms, and having 1 to 6 carbon atoms, preferably alkyl radicals having 1 or 2 carbon atoms, especially the methyl radical.

Examples of radicals $R^1$ are hydrogen atoms, the radicals specified for R and optionally substituted hydrocarbon radicals bonded via nitrogen, phosphorus, oxygen, sulfur, carbon or carbonyl group to the carbon atom.

The radical $R^1$ is preferably a hydrogen atom or hydrocarbon radical having 1 to 20 carbon atoms, especially a hydrogen atom.

Examples of radical $R^2$ are a hydrogen atom or the examples specified for radical R.

The radicals $R^2$ are preferably hydrogen or alkyl radicals, optionally substituted with halogen atoms, having 1 to 10 carbon atoms, more preferably alkyl radicals having 1 to 4 carbon atoms, and especially the methyl or ethyl radicals.

Examples of radicals $R^3$ are hydrogen, a —CH(COOR')—CH$_2$—COOR' group or the radicals specified for R, especially cyclohexyl, cyclopentyl, n- and isopropyl-, n-, iso- and t-butyl-, the diverse stereoisomers of the pentyl radical, hexyl radical or heptyl radical and also the phenyl radical.

Radical $R^3$ is preferably hydrogen, a —CH(COOR')—CH$_2$—COOR' group, a —(CR$^1_2$)$_b$—SiR$_a$(OR$^2$)$_{3-a}$ group where R, R', $R^1$, $R^2$, a and b equal one of the definitions specified in formula (I) or an optionally substituted hydrocarbon radical having 1 to 20 carbon atoms, preferably a linear, branched or cyclic alkyl group having 1 to 20 carbon atoms or an aryl group having 6 to 20 carbon atoms optionally substituted with halogen atoms, more preferably a linear, branched or cyclic alkyl group having 1 to 8 carbon atoms.

The radicals R' are preferably alkyl groups having 1 to 10 carbon atoms, more preferably methyl, ethyl or propyl radicals.

If the variable Z is an oxygen atom, $R^3$ is preferably hydrogen.

If the variable Z is an NH group, $R^3$ is preferably one of the aforementioned definitions other than hydrogen.

The radicals Y preferably have number-average molar masses $M_n$ of at least 200 g/mol, more preferably at least 500 g/mol, and especially at least 1 000 g/mol. The radicals Y preferably have number-average molar masses $M_n$ of at most 40,000 g/mol, more preferably at most 25,000 g/mol, and especially of at most 20,000 g/mol.

In the context of the present invention, the number-average molar mass $M_n$ in this case is determined by size exclusion chromatography (SEC) against a polystyrene standard, in THF, at 60° C., flow rate 1.2 ml/min and detection by RI (refractive index detector) on a Styragel column set HR3-HR4-HR5-HR5 from Waters Corp. USA with an injection volume of 100 μl.

Examples of polymer radical Y are organic polymer radicals, the number-average molecular mass of which is 200 to 40,000 g/mol and comprise as polymer chain polyoxyalkylenes such as polyoxyethylene, polyoxypropylene, polyoxybutylene, polyoxytetramethylene, polyoxyethylene-polyoxypropylene copolymer and polyoxypropylene-polyoxybutylene copolymer; hydrocarbon polymers such as polyisobutylene and copolymers of polyisobutylene with isoprene; polychloroprenes; polyisoprenes; polyurethanes; polyesters; polyamides; polyacrylates; polymethacrylates; vinyl polymers or polycarbonates.

The polymer radical Y is preferably chosen from polyester, polyether, polyurethane, polyalkylene or polyacrylate radicals, more preferably polyurethane radicals, polyester radicals or polyoxyalkylene radicals, and especially polyoxypropylene radicals, with the proviso that the number-average molecular mass thereof is 200 to 40,000 g/Mol, more preferably 6000 to 22,000 g/mol.

Examples of bismuth-containing catalysts (K) used according to the invention are bismuth carboxylates such as bismuth (2-ethylhexanoate), bismuth neodecanoate or bismuth tetramethylheptanedionate. Also catalysts comprising further metals in addition to bismuth, especially bismuth-zinc mixed catalysts, are suitable for the method according to the invention. Examples of commercially available catalysts are Borchi® Kat 22, Borchi® Kat VP 0243, Borchi® Kat VP 0244 or OMG 315 (all OMG Borchers), Bi neodecanoate from Chemos or American Elements, Reaxis MSA 70 or Reaxis C 719 from Reaxis, BICAT® catalysts (The Shepherd Chemical Company, USA) and K-Kat® K-348 (KING INDUSTRIES, INC., USA).

The catalyst (K) used according to the invention is preferably chosen from carboxylates of bismuth, wherein bismuth (2-ethylhexanoate), bismuth neodecanoate or mixtures thereof are particularly preferred.

In the method step according to the invention, catalysts (K) are preferably used in amounts from 1 to 1000 ppm, more preferably 20 to 600 ppm, and especially 60 to 400 ppm. The ppm figures in this case describe 1 part by weight catalyst (K) per 1,000,000 parts by weight of reaction mixture.

The water present according to the invention in this case can get into the reaction mixture according to the invention in various ways. For instance, it may be a by-product in the production of polymer $Y-(ZH)_x$ used, which subsequently was not removed or at least not completely removed from the polymer, where Y, Z and x have a definition specified in formula (I). If a polyether, particularly a polypropylene glycol, is used as polymer $Y-(ZH)_x$, it may lead even in traces to elimination of the terminal OH group with elimination of water, before or after the polymer production. In addition, water may pass or transfer into the polymer also by contact of the polymer $Y-(ZH)_x$ with moisture in the air, e.g. during storage. Finally, water can also pass into the same by contact with air of the reaction partners before or during the mixing together of the reaction mixture according to the invention.

Also conceivable is a deliberate addition of water, for example in the form of distilled water or conventional tap water, especially if, in addition to the polymers of the formula (I), at the same time a reaction product of the added water with a further component of the reaction mixture, for example one of the isocyanatosilanes (c1) or (c2) mentioned below, is also intended to be generated by the method according to the invention.

The method according to the invention is preferably carried out at temperatures between 20° C. and 180° C., more preferably between 40° C. and 150° C., and especially between 50° C. and 120° C. If the method according to the invention is carried out in two or more reaction steps, each individual step is preferably carried out in the preferred temperature ranges specified above.

The method according to the invention is preferably carried out at a pressure of 100 to 2000 hPa, more preferably at 900 to 1100 hPa.

The method according to the invention is preferably carried out in a protective gas atmosphere, more preferably argon or nitrogen.

The method according to the invention may be carried out continuously, for example in one or more tubular reactors or loop reactors, in cascades connected in series of two or more tubular reactors or also only in one tubular reactor to which fresh reactants are added continuously, while at the same time reaction mixture is continuously removed. Combinations of several reactor types are also conceivable.

The method according to the invention may also be carried out discontinuously, for example in a tubular reactor in which all reactants are added optionally simultaneously or in close succession or also in two or more method steps clearly separated from one another chronologically.

A preferred subject matter of the invention is a method for producing silane-terminated polymers (method variant 1) of the formula (Ia)

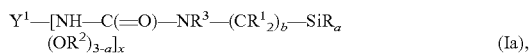

(Ia), by reacting
(a1) at least one hydroxy-functional polymer comprising at least one polyether, polyester and/or polyacrylate unit,
(b1) at least one di- and/or polyisocyanate and
(c1) at least one aminosilane of the formula

 (II)

and optionally further components different from (a1), (b1) and (c1),
wherein
$Y^1$ is an x-valent polyurethane radical comprising at least one polyether, polyester and/or polyacrylate unit,
and all other variables having the definition specified in formula (I),
with the provisos that, in at least one method step, the hydroxy-functional polymer (a1) is reacted with the di- or polyisocyanates (b1) or an isocyanate-functional conversion product, which is produced from a reaction of the di- or polyisocyanates (b1) and the aminosilane (c1), that this method step is carried out in the presence of at least one bismuth-containing catalyst (K), and that the reaction mixture comprises 50 to 250 ppm water at the start of this reaction step.

In the production of the silane-terminated polymers of the formula (Ia), preferably no further components are used in addition to the components (a1), (b1) and (c1) and catalyst (K) and water.

In method variant 1 according to the invention, the ratios by weight of the components (a1), (b1) and (c1) are preferably selected such that 0.5 to 1.5 mol, more preferably 0.8 to 1.3 mol, and especially 0.95 to 1.2 mol of isocyanate-reactive groups of the components (a1) and (c1) are used per mole of isocyanate groups of component (b1).

The polyols (a1) used according to the invention are preferably branched or unbranched polyether polyols or polyester polyols, preferably polyether polyols, more preferably polypropylene glycols, and especially unbranched polypropylene glycols or polypropylene glycols with a branching point.

The polyols (a1) used according to the invention preferably have a number-average molar mass $M_n$ of 200 to 30,000 g/mol, more preferably 600 to 24,000 g/mol, and especially 900 to 20,000 g/mol. These are preferably unbranched.

The polyols (a1) used according to the invention preferably have a viscosity at 23° C. of 10 to 1,000,000 mPas, more preferably 1000 to 300,000 mPas.

In the context of the present invention, the viscosity is determined after temperature control at 23° C. with a DV 3P rotational viscometer from A. Paar (Brookfield systems), using spindle 5 at 2.5 rpm in accordance with ISO 2555.

The polyols (a1) used according to the invention are commercial products or can be prepared by common methods in polymer chemistry.

Mixtures of different polyols can also be used as component (a1), particularly also mixtures of unbranched and mono-branched polyols. Preferably, however, unbranched polyols are used exclusively.

The polyols (a1) in this case preferably comprise so much water that this is responsible for at least 90% of the total amount of water present in the reaction mixture according to the invention.

Examples of component (b1) used according to the invention are all common di- or polyisocyanates such as, e.g. diisocyanatodiphenylmethane (MDI), either in the form of crude or technical grade MDI or in the form of pure 4,4' or 2,4' isomers or mixtures thereof, tolylene diisocyanate (TDI)

in the form of its various regioisomers, especially 2,4- and 2,6-TDI and mixtures of these regioisomers, diisocyanatonaphthalene (NDI), isophorone diisocyanate (IPDI) or also hexamethylene diisocyanate (HDI). Examples of polyisocyanates are polymeric MDI (p-MDI), triphenylmethane triisocyanate or else trimers (biurets or isocyanurates) of the diisocyanates specified above. Mixtures of different di- and/or polyisocyanates can also be used.

Isocyanates (b1) used according to the invention are commercial products or can be prepared by methods common in chemistry.

Preferably component (c1) used according to the invention is $HN[(CH_2)_3—Si(OCH_3)_3]_2$, $HN[(CH_2)_3—Si(OC_2H_5)_3]_2$, $HN[(CH_2)_3—Si(OCH_3)_2CH_3]_2$, $HN[(CH_2)_3—Si(OC_2H_5)_2CH_3]_2$, $HN[(CH_2)—Si(OCH_3)_3]_2$, $HN[(CH_2)—Si(OC_2H_5)_3]_2$, $HN[(CH_2)—Si(OCH_3)_2CH_3]_2$, $HN[(CH_2)—Si(OC_2H_5)_2CH_3]_2$, cyclo-$C_6H_{11}NH(CH_2)_3—Si(OCH_3)_3$, cyclo-$C_6H_1NH(CH_2)_3—Si(OC_2H_5)_3$, cyclo-$C_6H_{11}NH(CH_2)_3—Si(OCH_3)_2CH_3$, cyclo-$C_6H_{11}NH(CH_2)_3—Si(OC_2H_5)_2CH_3$, cyclo-$C_6H_{11}NH(CH_2)—Si(OCH_3)_3$, cyclo-$C_6H_{11}NH(CH_2)—Si(OC_2H_5)_3$, cyclo-$C_6H_{11}NH(CH_2)—Si(OCH_3)_2CH_3$, cyclo-$C_6H_{11}NH(CH_2)—Si(OC_2H_5)_2CH_3$, phenyl-$NH(CH_2)_3—Si(OCH_3)_3$, phenyl-$NH(CH_2)_3—Si(OC_2H_5)_3$, phenyl-$NH(CH_2)_3—Si(OCH_3)_2CH_3$, phenyl-$NH(CH_2)_3—Si(OC_2H_5)_2CH_3$, phenyl-$NH(CH_2)—Si(OCH_3)_3$, phenyl-$NH(CH_2)—Si(OC_2H_5)_3$, phenyl-$NH(CH_2)—Si(OCH_3)_2CH_3$, phenyl-$NH(CH_2)—Si(OC_2H_5)_2CH_3$, alkyl-$NH(CH_2)_3—Si(OCH_3)_3$, alkyl-$NH(CH_2)_3—Si(OC_2H_5)_3$, alkyl-$NH(CH_2)_3—Si(OCH_3)_2CH_3$, alkyl-$NH(CH_2)_3—Si(OC_2H_5)_2CH_3$, alkyl-$NH(CH_2)—Si(OCH_3)_3$, alkyl-$NH(CH_2)—Si(OC_2H_5)_3$, alkyl-$NH(CH_2)—Si(OCH_3)_2CH_3$ or alkyl-$NH(CH_2)—Si(OC_2H_5)_2CH_3$, more preferably cyclo-$C_6H_{11}NH(CH_2)_3—Si(OC_2H_5)_3$, cyclo-$C_6H_{11}NH(CH_2)_3—Si(OCH_3)_2CH_3$, cyclo-$C_6H_{11}NH(CH_2)_3—Si(OC_2H_5)_2CH_3$, cyclo-$C_6H_{11}NH(CH_2)—Si(OCH_3)_3$, cyclo-$C_6H_{11}NH(CH_2)—Si(OC_2H_5)_3$, cyclo-$C_6H_{11}NH(CH_2)—Si(OCH_3)_2CH_3$, cyclo-$C_6H_{11}NH(CH_2)—Si(OC_2H_5)_2CH_3$, phenyl-$NH(CH_2)_3—Si(OCH_3)_3$, phenyl-$NH(CH_2)_3—Si(OC_2H_5)_3$, phenyl-$NH(CH_2)_3—Si(OCH_3)_2CH_3$, phenyl-$NH(CH_2)_3—Si(OC_2H_5)_2CH_3$, phenyl-$NH(CH_2)—Si(OCH_3)_3$, phenyl-$NH(CH_2)—Si(OC_2H_5)_3$, phenyl-$NH(CH_2)—Si(OCH_3)_2CH_3$, phenyl-$NH(CH_2)—Si(OC_2H_5)_2CH_3$, alkyl-$NH(CH_2)_3—Si(OCH_3)_3$, alkyl-$NH(CH_2)_3—Si(OC_2H_5)_3$, alkyl-$NH(CH_2)_3—Si(OCH_3)_2CH_3$, alkyl-$NH(CH_2)_3—Si(OC_2H_5)_2CH_3$, alkyl-$NH(CH_2)—Si(OCH_3)_3$, alkyl-$NH(CH_2)—Si(OC_2H_5)_3$, alkyl-$NH(CH_2)—Si(OCH_3)_2CH_3$ or alkyl-$NH(CH_2)—Si(OC_2H_5)_2CH_3$, where "alkyl" is preferably an ethyl, n-propyl, isopropyl, n-butyl, isobutyl, t-butyl radical and also the various stereoisomers of the pentyl, hexyl, heptyl or octyl radical.

According to method variant 1 according to the invention, the silane-terminated polyurethanes of the formula (Ia) can be produced by a simultaneous reaction of all components (a1), (b1) and (c1). Often however, a multi-stage process is preferred in which firstly the hydroxy-functional polymer (a1) is reacted with an excess of a di- or polyisocyanate (b1), before reaction with the silanes (c1) is carried out. In this manner, secondary reactions can be minimized in which the hydroxy-functional polymer (a1) reacts with the silyl groups of the silane (c1) and substitutes a hitherto Si-bonded alkoxy group to form a polymer-O—Si bond.

The latter described multi-stage method can also be carried out continuously or discontinuously. The former is accomplished in two or more reactors connected in series, in which the different reaction steps are carried out, whereas in the discontinuous process the stepwise reaction regime is achieved by an appropriately controlled successive addition of the reactants. The bismuth catalyst (K) is required in both cases, especially for the first reaction step, the reaction of the components (a1) and (b1). At the start of this reaction step, the water content according to the invention is from 50 to 250 ppm. The second reaction step, the reaction of the isocyanate groups remaining after step 1 with aminosilanes (c1), generally does not require catalyst because of the extremely high reactivity of isocyanate groups to amines. Therefore, catalyst and water content during this second reaction step are generally irrelevant.

A further preferred subject matter of the invention is a method for producing silane-terminated polymers (method variant 2) of the formula (Ib)

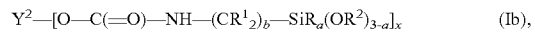

by reacting
(a2) at least one hydroxy-functional polymer comprising at least one polyether, polyester and/or polyacrylate unit,
(b2) at least one di- and/or polyisocyanate and
(c2) at least one isocyanatosilane of the formula

and optionally further components different from (a2), (b2) and (c2),
wherein
$Y^2$ is an x-valent polyurethane radical comprising at least one polyether, polyester and/or polyacrylate unit,
and all other variables having the definition specified in formula (I),
with the provisos that, in at least one method step, the hydroxy-functional polymer (a2) is reacted with the di- or polyisocyanate (b2) and/or an isocyanatosilane (c2), that this method step is carried out in the presence of at least one bismuth-containing catalyst (K) and that the reaction mixture comprises 50 to 250 ppm water at the start of this method step.

In the production of the silane-terminated polymers of the formula (Ib), preferably no further components are used apart from the components (a2), (b2) and (c2) and also catalyst (K) and water.

In method variant 2 according to the invention, the ratios by weight of the components (a2), (b2) and (c2) in this case are preferably selected such that 0.5 to 1.5 mol, particularly preferably 0.8 to 1.3 mol, especially 0.95 to 1.2 mol of hydroxyl groups of the components (a2) are used per mole of isocyanate groups of components (b2) and (c2).

The polyols (a2) used according to the invention are preferably the same polyols which have already been described above as polyols (a1), including the preferred species specified therein.

The di- and/or polyisocyanates (b2) used according to the invention are preferably the same di- and/or polyisocyanates which have already been described above as di- and/or polyisocyanates (b1), including the preferred species specified therein.

The component (c2) is preferably
$OCN(CH_2)_3—Si(OCH_3)_3$, $OCN(CH_2)_3—Si(OC_2H_5)_3$, $OCN(CH_2)_3—Si(OCH_3)_2CH_3$, $OCN(CH_2)_3—Si(OC_2H_5)_2CH_3$, $OCN(CH_2)—Si(OCH_3)_3$, $OCN(CH_2)—Si(OC_2H_5)_3$, $OCN(CH_2)—Si(OCH_3)_2CH_3$ oder $OCN(CH_2)—Si(OC_2H_5)_2CH_3$, wherein $OCN(CH_2)_3—Si(OCH_3)_3$ or $OCN(CH_2)—Si(OCH_3)_2CH_3$ are particularly preferred.

According to method variant 2 according to the invention, the silane-terminated polyurethanes of the formula (Ib) can be produced by simultaneous reaction of all components (a2), (b2) and (c2). Also here, however, a multi-stage process is often preferred in which firstly the hydroxy-functional polymer (a2) is reacted with di- or polyisocyanate (b2), before the reaction with the silane (c2) is carried out.

The only difference to the production of the silane-terminated polyurethane according to method variant 1 described further above consists in that here the isocyanate component in the first reaction step is not used in excess but in deficit. In this manner, a hydroxy-terminated polyurethane is obtained, which is then reacted in a following step with the isocyanate-functional silane (c2).

This method also—likewise as already described above in method variant 1—can be carried out continuously or discontinuously. Bismuth catalyst (K) is generally required here for both reaction steps. Critical, however, is the water content in the reaction mixture at the start of the first reaction step, which, in accordance with the invention must be from 50 to 250 ppm. Higher water contents at the start of the reaction damage the catalyst (K) irreversibly, such that the catalyst can no longer catalyse both reaction steps or only with significantly reduced reactivity.

In a particularly preferred embodiment of method variant 2, a hydroxy-functional polyurethane is produced by reacting the components (a2) and (b2), which is then reacted with an excess of an isocyanate-functional silane (c2). In this case, preferably 1.01 to 2.00 mol, particularly preferably 1.05 to 1.50 mol, especially 1.05 to 1.30 mol of isocyanate-functional silanes (c2) are used per 1 mol of hydroxyl groups present in the polyurethane intermediate product. In this manner, not only a rapid but also a largely complete termination of all previously hydroxy-functional chain ends is achieved.

Since in the case of a procedure of this kind unreacted isocyanate-functional silanes (c2) may remain in the reaction mixture, this is preferably quenched by adding an isocyanate-reactive compound after completion of the polymer production. This isocyanate-reactive compound may in principle be any compound having at least one group reactive to isocyanates. Preferred in this case are amines or alcohols, particularly preferably alcohols, especially low molecular weight alcohols such as methanol, ethanol, propanol, isopropanol, butanol or isobutanol.

In the case of a discontinuous process regime, quenching can be effected by simple addition of the isocyanate-reactive compound after completion of the synthesis of the polymers of the formula (Ib). If the method is carried out continuously, the quenching step is also preferably carried out continuously by mixing in the isocyanate-reactive compound continuously into the reaction mixture after the production of the silane-terminated polymers and optionally reacting in a separate reactor.

As in the case of the reaction according to the invention itself, the quenching step is also preferably carried out at temperatures between 20° C. and 180° C., more preferably between 40° C. and 150° C., especially between 50° C. and 120° C.

A further preferred subject matter of the invention is a method for producing silane-terminated polymers (method variant 3) of the formula (Ic)

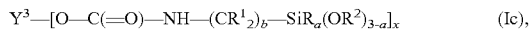
$$Y^3-[O-C(=O)-NH-(CR^1{}_2)_b-SiR_a(OR^2)_{3-a}]_x \qquad (Ic),$$

by reacting
- (a3) at least one hydroxy-functional polymer comprising at least one polyether, polyester and/or polyacrylate unit, and
- (c3) at least one isocyanatosilane of the formula (III) and optionally further components different from (a3) and (c3) and the component (b2) described above, wherein all variables have the definition specified in formula (I) and $Y^3$ has the definition specified for Y, with the provisos that the reaction of the hydroxy-functional polymer (a3) with the isocyanatosilane (c3) is carried out in the presence of at least one bismuth-containing catalyst (K), and that the reaction mixture comprises 50 to 250 ppm water at the start of this method step.

Preferably, in the production of the silane-terminated polymers of the formula (Ic), no further components are used apart from the components (a3) and (c3) and catalyst (K) and water.

In method variant 3 according to the invention, the ratios by weight of the components (a3) and (c3) in this case are preferably selected such that 0.5 to 2.0 mol, more preferably 0.8 to 1.5 mol, especially 0.95 to 1.4 mol of isocyanate groups of the component (c3) are used per mole of hydroxyl groups of the components (a3)

In a particularly preferred embodiment, the hydroxy-functional polymer (a3) is reacted with an excess of isocyanate-functional silane (c3). That is to say, the ratios by weight of the components (a3) and (c3) are preferably selected such that 1.01 to 1.4 mol, more preferably 1.05 to 1.3 mol, and especially 1.05 to 1.2 mol of isocyanate groups of the component (c3) are used per mole of hydroxyl groups of the components (a3). In this manner, not only a rapid but also a largely complete termination of all chain ends is achieved.

Since in the case of a procedure of this kind unreacted isocyanate-functional silanes (c3) may remain in the reaction mixture, these are preferably quenched by adding an isocyanate-reactive compound after completion of the polymer production. The quenching step is preferably effected in this case in the same manner as has already been described in method variant 2.

The polyols (a3) used according to the invention are preferably the same polyols which have already been described above as polyols (a1), including the preferred species specified therein.

The isocyanate-functional silanes (c3) used according to the invention are preferably the same silanes which have already been described above as silanes (c2), including the preferred species specified therein.

Method variant 3 according to the invention can also be carried out continuously or discontinuously.

The components used in the method according to the invention may in each case be one type of said component as well as a mixture of at least two types of a respective component.

The method according to the invention has the advantage that it is rapid and simple to implement, while readily available raw materials are used as reactants.

Furthermore, the method according to the invention has the advantage that the relevant silane crosslinkable polymers produced are comparatively storage-stable and, without adding an additional curing catalyst, only react very slowly with moisture in the air. This facilitates not only their storage but also their further processing.

A further advantage of the method according to the invention is that the polymers produced can be directly used further, for example in the production of crosslinkable compositions.

The silane-terminated polymers produced in accordance with the invention can be used anywhere where silane-terminated polymers have also been used to date.

In particular, they are suitable for use in crosslinkable compositions, especially in adhesives and sealants and also coatings that are curable at room temperature. The production of silane crosslinkable coatings, adhesives and sealants from appropriate polymers has already been described many times in the literature, e.g. in EP 1535940, EP 2785755, EP 2744842 or EP 2561024. The moisture-curing formulations described in these documents based on silane-terminated polymers, the further ingredients used in this case as well as the methods for producing appropriate formulations described therein are also to be included in the disclosure content of this description, such as the applications described therein for the finished formulated coatings, adhesives and sealants.

In the examples described below, all viscosity data refer to a temperature of 20° C. Unless stated otherwise, the following examples are carried out at a pressure of the surrounding atmosphere, i.e. at about 1000 hPa, and room temperature, i.e. at about 20° C., or at a temperature which arises on mixing the reactants at room temperature without additional heating or cooling.

Comparative Example 1 (Non-Inventive)

In a 1000 ml reaction vessel with possibilities for stirring, cooling and heating, 469.0 g of a hydroxy-terminated polypropylene glycol having an average molar mass $M_n$ of 12,000 g/mol (commercially available under the name Acclaim 12200 from Covestro AG, Leverkusen, Germany) are initially charged and dried at 80° C. and 1 mbar for 2 h with stirring. Distinct foaming during the first 15-30 min of the drying time indicates the escape of traces of moisture from the polyol.

The vacuum is then released with argon. The entire following reaction is carried out under an argon protective gas atmosphere.

5 g of the dried polyether is withdrawn. This is used to determine the water content by so-called Karl-Fischer analysis in accordance with DIN 51777, paragraphs 4.3 and 4.1.2 (version of 2016-08). The water content is 34 ppm (34 parts by weight water per 1,000,000 parts by weight polyol).

The 464.0 g (77.3 mmol) of polyether remaining in the reaction vessel therefore have the same water content. Based on the total reaction mixture, a water content of nearly 33 ppm results therefrom.

To carry out the silane-termination, firstly 22.85 g of isocyanatomethylmethyldimethoxysilane (GENIOSIL® XL 42 from Wacker Chemie AG, Munich, Germany) are added dropwise to the dried polyether at 80° C. and then 0.071 g of OMG catalyst 315 (a bismuth neodecanoate-containing catalyst from OMG Borchers) is added by means of an Eppendorf pipette. This corresponds to a value of 150 ppm catalyst based on the total weight of the reaction mixture. Directly after the catalyst addition, the reaction mixture is heated to 84-85° C. The mixture is subsequently stirred at a temperature of 80° C.

After 60 min, a sample is removed from the reaction mixture and investigated by IR analysis for isocyanatosilane residues possibly still present. The sample is free of isocyanate and the reaction has therefore fully run to completion within a reaction time suitable for an industrial process.

Example 1

The procedure is the same as in comparative example 1 with the only difference that 100 ppm water are added by Eppendorf pipette to the polypropylene glycol after drying and prior to the addition of the isocyanatosilane and catalyst. According to the aforementioned Karl-Fischer analysis, a water content in the polyol of 128 ppm is apparent. Based on the total reaction mixture, a water content of nearly 124 ppm results therefrom. As in comparative example 1, the reaction mixture here is heated to ca. 84° C. directly after addition of catalyst. Subsequently, the mixture is stirred at a temperature of 80° C. 60 min after addition of the catalyst, a sample is removed from the reaction mixture and investigated by IR analysis for isocyanatosilane residues possibly still present. The sample is free of isocyanate and the reaction has therefore fully run to completion within a reaction time suitable for an industrial process despite the higher water content.

Example 2

The procedure is the same as in comparative example 1 with the only difference that 150 ppm water are added by Eppendorf pipette to the polypropylene glycol after drying and prior to the addition of the isocyanatosilane and catalyst. According to the aforementioned Karl-Fischer analysis, a water content in the polyol of 197 ppm is apparent. Based on the total reaction mixture, a water content of somewhat more than 190 ppm results therefrom.

As in comparative example 1, the reaction mixture here is heated to ca. 84° C. directly after addition of catalyst. Subsequently, the mixture is stirred at a temperature of 80° C.

60 min after addition of the catalyst, a sample is removed from the reaction mixture and investigated by IR analysis for isocyanatosilane residues possibly still present. The sample is free of isocyanate and the reaction has therefore fully run to completion within a reaction time suitable for an industrial process despite the higher water content.

Comparative Example 2 (Non-Inventive)

The procedure is the same as in comparative example 1 with the only difference that 300 ppm water are added by Eppendorf pipette to the polypropylene glycol after drying and prior to the addition of the isocyanatosilane and catalyst. According to the aforementioned Karl-Fischer analysis, a water content in the polyol of 336 ppm is apparent. Based on the total reaction mixture, a water content of somewhat more than 325 ppm results therefrom.

Unlike in comparative example 1, however, no significant heating of the reaction mixture is discernible after the addition of catalyst.

60 min after addition of the catalyst, a sample is removed from the reaction mixture and investigated by IR analysis for isocyanatosilane residues possibly still present. A clearly recognizable band at a wavelength of 2265 $cm^{-1}$ reveals in this case the presence of still unreacted isocyanatosilane.

The reaction is resumed at a reaction temperature of 80° C. with stirring. However, the aforementioned isocyanate band is also still present after reaction times of 1½, 2, 3 and 4 h. Only after a dramatically extended reaction time, in comparison to examples 1 and 2, of 5 h has the isocyanate band disappeared and the reaction has therefore run to completion.

Comparative Example 3 (Non-Inventive)

The procedure is the same as in comparative example 2. After the addition of 300 ppm water to the polypropylene glycol, a water content of 331 ppm resulted. Based on the total reaction mixture, a water content of ca. 320 ppm results therefrom.

The only difference to comparative example 2 consists in that here double the amount of OMG 315 catalyst (0.142 g, 300 ppm based on the reaction mixture) is added.

Nevertheless, here also, as in comparative example 2, no significant heating of the reaction mixture is discernible after the catalyst addition.

60 min after addition of the catalyst, a sample is removed from the reaction mixture and investigated by IR analysis for isocyanatosilane residues possibly still present. A clearly recognizable band at a wavelength of 2265 cm$^{-1}$ reveals in this case the presence of still unreacted isocyanatosilane.

The reaction is resumed at a reaction temperature of 80° C. with stirring. However, the aforementioned isocyanate band is also still present after reaction times of 1½, 2 and 3 h. Only after an only slightly reduced reaction time of 4 h in comparison to comparative example 2 and as before a reaction time that is too long for a cost-effective industrial process, has the isocyanate band disappeared and the reaction has therefore run to completion.

The invention claimed is:

1. A method for producing silane-terminated polymers of the formula (Ic)

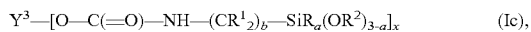

(Ic), wherein

Y$^3$ is an x-valent branched or unbranched polyether radical,

R are identical or different and are monovalent, optionally substituted, SiC-bonded hydrocarbon radicals, R$^1$ are identical or different and are hydrogen or monovalent, optionally substituted hydrocarbon radicals, R$^2$ are identical or different and are hydrogen or monovalent, optionally substituted hydrocarbon radicals, by reacting (a3) at least one hydroxy-functional, branched or unbranched polyether polyol, and (c3) at least one isocyanatosilane of the formula (III)

(III)

and optionally further components different from (a3) and (c3) and wherein diisocyanates and polyisocyanates are excluded from said reacting, with the provisos that the reaction of the hydroxy-functional polymer (a3) with the isocyanatosilane (c3) is carried out in the presence of at least one bismuth-containing catalyst (K), and that the reaction mixture comprises 50 to 250 ppm water at the start of this method step.

(III)

2. The method of claim 1, wherein the ratios by weight of the components (a3) and (c3) are selected such that 0.5 to 2.0 mol of isocyanate groups of the component (c3) are used per mole of hydroxyl groups of the components (a3).

3. The method of claim 1, wherein the hydroxy-functional polymer (a3) is used with an molar excess of isocyanate-functional silane (c3).

4. The method of claim 1, wherein at least one component (c3) is
OCN(CH$_2$)$_3$—Si(OCH$_3$)$_3$, OCN(CH$_2$)$_3$—Si(OC$_2$H$_5$)$_3$, OCN(CH$_2$)$_3$—Si(OCH$_3$)$_2$CH$_3$, OCN(CH$_2$)$_3$—Si(OC$_2$H$_5$)$_2$CH$_3$, OCN(CH$_2$)—Si(OCH$_3$)$_3$, OCN(CH$_2$)—Si(OC$_2$H$_5$)$_3$, OCN(CH$_2$)—Si(OCH$_3$)$_2$CH$_3$ or OCN(CH$_2$)—Si(OC$_2$H$_5$)$_2$CH$_3$.

5. The method of claim 1, which is carried out at temperatures between 20° C. and 180° C.

* * * * *